United States Patent [19]

Dudley et al.

[11] Patent Number: 5,754,754
[45] Date of Patent: May 19, 1998

[54] TRANSMISSION ORDER BASED SELECTIVE REPEAT DATA TRANSMISSION ERROR RECOVERY SYSTEM AND METHOD

[75] Inventors: John G. Dudley, Raleigh; Mohammad Peyravian, Cary, both of N.C.

[73] Assignee: International Business Machines Corporation, Armonk, N.Y.

[21] Appl. No.: 506,934

[22] Filed: Jul. 26, 1995

[51] Int. Cl.$^6$ .................................................. G06F 11/00
[52] U.S. Cl. ................................................. 395/182.16
[58] Field of Search ....................... 395/182.16, 200.13, 395/200.17, 856, 182.13; 364/204.8; 371/30, 32; 370/216, 218, 231, 242, 394, 912

[56] References Cited

U.S. PATENT DOCUMENTS

| | | | |
|---|---|---|---|
| 4,439,859 | 3/1984 | Donnan | 371/32 |
| 4,901,277 | 2/1990 | Soloway et al. | 364/900 |
| 5,027,356 | 6/1991 | Nakamura et al. | 371/32 |
| 5,210,751 | 5/1993 | Onoe et al. | 370/94.1 |
| 5,315,635 | 5/1994 | Kane et al. | 379/57 |
| 5,319,648 | 6/1994 | Bux et al. | 371/32 |
| 5,337,313 | 8/1994 | Buchholz et al. | 370/94.1 |
| 5,396,537 | 3/1995 | Schwendeman | 379/57 |
| 5,477,550 | 12/1995 | Crisler et al. | 371/32 |
| 5,487,068 | 1/1996 | Smolinske et al. | 370/94.1 |

OTHER PUBLICATIONS

Bux, et al., Performance of an Improved Data Link Control Protocol, Computer Communication Technologies for the 90's, pp. 251–258, J. Raviv ed. (1988).

Weldon, An Improved Selective–Repeat ARQ Strategy, IEEE Transactions on Communications, vol. Com–30, No. 3, pp. 480–486 (Mar. 1982).

Miller et al., The Analysis of Some Selective–Repeat ARQ Schemes with Finite Receiver Buffer, IEEE Transactions on Communications, vol. Com–29, No. 9, pp. 1307–1315 (Sep. 1981).

International Business Machines Corporation, *Rapid Transport Protocol (RTP)*, pp. 1–15. [Feb. 1994].

International Business Machines Corporation, *APPN High Performance Routing* (Draft document), Document No. HPR–1. [Sep. 1993].

International Business Machines Corporation, *APPN High Performance Routing* (APlevel document), Document No. HPR–2. [Sep. 1994].

*Primary Examiner*—Robert W. Beausoliel, Jr.
*Assistant Examiner*—Stephen C. Elmore
*Attorney, Agent, or Firm*—Myers Bigel Sibley & Sajovec; Robert W. Glatz; Gerald R. Woods

[57] ABSTRACT

An error recovery system and method for use in a data communication system in which a sender station transmits information packets with sequentially numbered information to a receiver station. The system includes selective retransmission of information packets which have had errors in transmission based on the order of transmission of information packets independent of the sequential (sequence) number of the information packets. A list, such as a linked list having a beginning and an end, is provided and, at the time of transmission of information packets, an identification of the transmitted information packet is placed at the end of the list. A status packet is provided by the receiver station to the sender station which identifies the sequential number of information packets which have been correctly received. Any information packets which have not been acknowledged as correctly received are retransmitted only if such packet was transmitted earlier in time than an information packet which has been acknowledged as correctly received as indicated by the position of the information packets in the list. The receiver station detects the presence of gaps and transmits a status packet to the sender station either responsive to a request from the sender station or responsive to detection of a gap.

17 Claims, 7 Drawing Sheets

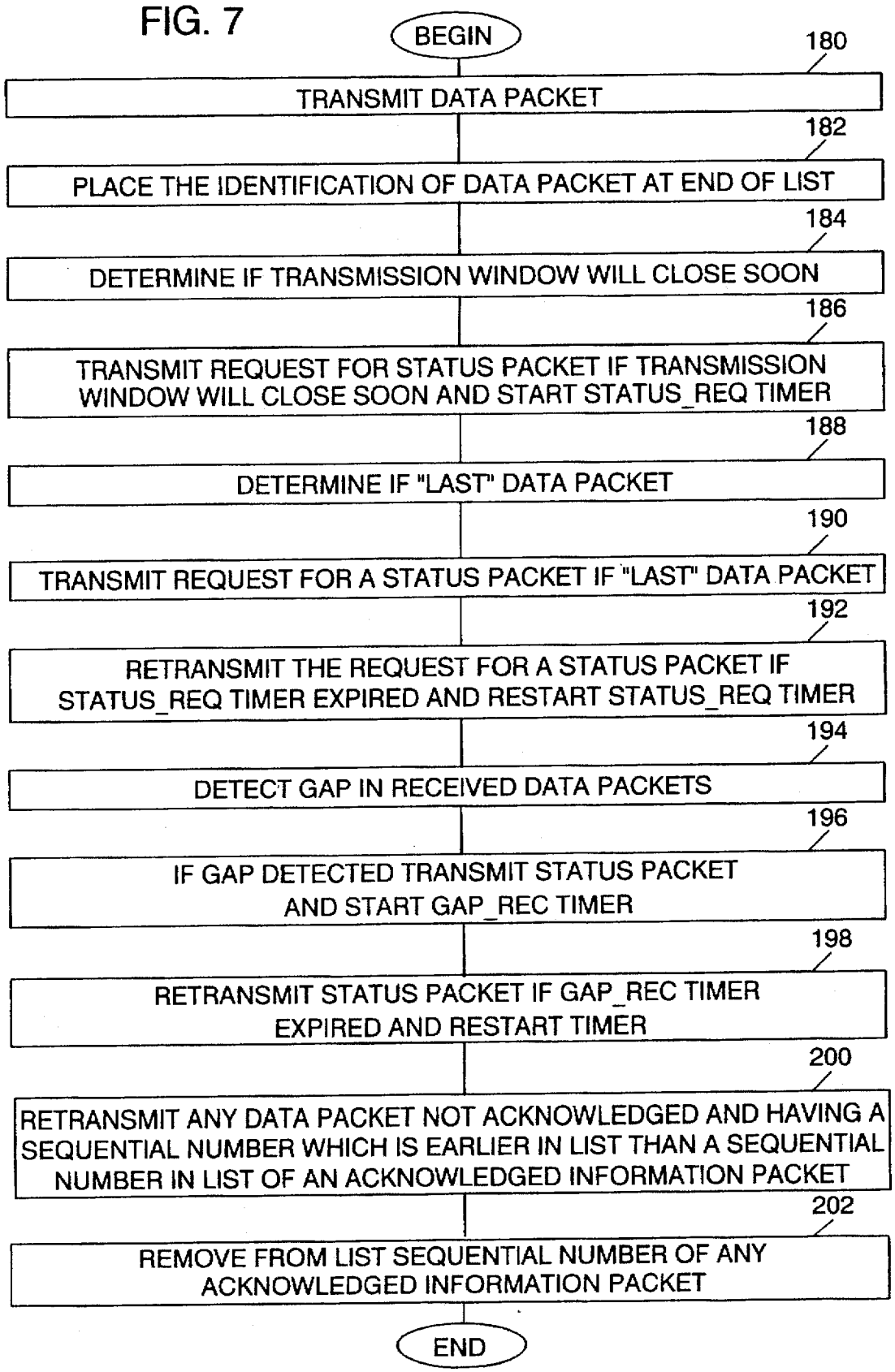

TRANSMISSION ORDER BASED SELECTIVE REPEAT DATA TRANSMISSION ERROR RECOVERY SYSTEM AND METHOD

FIELD OF THE INVENTION

The present invention relates to error recovery systems using Automatic Repeat Request ("ARQ") protocols and to methods for using such systems.

BACKGROUND OF THE INVENTION

Since ideal error-free communication channels have yet to be realized, data communication systems have to allow for retransmission of data when errors are detected. The technique which allows erroneous data to be retransmitted is known as Automatic Repeat Request (ARQ) and protocols that employ this technique are commonly called ARQ protocols. There are three basic ARQ protocols: stop-and-wait, go-back-N, and selective repeat.

In the stop-and-wait scheme, the sender station transmits a packet to the receiver station, starts a timer, and waits for an acknowledgment from the receiver station. If the packet is received correctly, the receiver station sends a positive acknowledgment and the sender station can transmit the next packet. If the timer expires, the sender station retransmits the packet, restarts the timer, and waits for an acknowledgment. This scheme is quite simple but very inefficient because of the idle time spent in waiting for an acknowledgment after each retransmission.

In the go-back-N scheme, the sender station transmits packets one after another until it receives a negative acknowledgment. Upon reception of a negative acknowledgment, the sender station retransmits the negatively acknowledged packet and all the packets following it. This scheme is more efficient than the stop-and-wait protocol when the transmission error rate is not too high and the link propagation delay is small. The major cause of the inefficiency associated with this scheme is due to the retransmission of many correctly received packets.

In the selective repeat scheme, the sender station transmits packets one after another until it receives a negative acknowledgment. Upon reception of a negative acknowledgment, the sender station retransmits only the packet(s) in error.

An example of a development in the area of selective-repeat-based error recovery systems is U.S. Pat. No. 4,439,859 to Donnan which relates to a method and system for retransmission of incorrectly received frames utilizing transmission order determination of what information frames should be retransmitted. At the time of retransmission of any information frame, a variable V(T), whose value is representative of the order in which a frame is retransmitted relative to the sequence of frames transmitted for the first time, is assigned to the frame by the transmitting station. Each frame also has a sequential number N(S) or send sequence number associated with the ordering of the data in the frames. The receiving station acknowledges receipt of frames by sending a check-point message which includes, inter alia, a receive sequence number N(R) indicating the receive sequence number N(S) of the most recently received, non-retransmitted, error free information frame, and identifiers, N(X), representative of the N(S) of any incorrect frames whose retransmission is requested. Frames are retransmitted if the value of V(T) is less than N(R). In the Donnan system, the transmission order determination is related to the sequential number of the information packets as V(T) is directly compared to the sequential number N(S) of the information packets. In addition using the sequential-number-based system of Donnan, acknowledgement of retransmitted packets does not trigger retransmission.

Additional references have discussed other variations on selective repeat error recovery systems which are intended to improve the performance of such systems. For example, a mechanism for flow control based on a transmission window was discussed in W. Bux, P. Kermani and W. Kleinoder, *Performance of an Improved Data Link Control Protocol*, Computer Communication Technologies for the 90's (J. Raviv ed. 1988). Flow control is provided because selective repeat systems must buffer out of sequence received data until the data packets with errors in transmission are successfully retransmitted. In practice the memory capacity of the receivers resequencing buffer is limited. In addition, other characteristics of the data communication system such as data transmission rates and round trip delay time result in some amount of data being "in-flight" on the network. Flow control is provided to account for the buffer size of the receiver and the data "in-flight" to prevent buffer overflow.

Selective-repeat-based error recovery systems are more efficient than the other ARQ schemes. However, selective repeat type error recovery systems require a resequencing buffer at the receiver station since packets can be received out of sequence. Use of a resequencing buffer creates the potential for a communication slowdown when the buffer is filled thereby creating a tradeoff of cost and performance of such systems related to buffer size. In particular, because the resequencing buffer is of finite size, situations can occur where the resequencing buffer gets full. The receiver sends an Allocated Sequence Number (ASEQ) to prevent the sender from sending data for which the receiver has no buffer space.

Furthermore, given the "in-flight" transmission round-trip delay time, large numbers of packets can be in transmission so that unacknowledged packets may exist either because of errors in transmission or merely because the packets were not received at the time the last acknowledgement information was transmitted to the sender station. Finally, additional computational load is placed on the transmit and receive processes to implement a selective repeat system.

SUMMARY OF THE INVENTION

Accordingly, it is an object of the present invention to provide a high performance error recovery system which performs efficiently in a wide range of data communication environments, including those using both fixed and variable length data packets, by only retransmitting data packets which had errors in transmission and which places little computational load on the transmit and receive processes.

It is a further object of the present invention to provide prompt notification to a sender station of detection of an error in transmission.

It is a further object of the present invention to provide a means for acknowledgement of the last information packet transmitted in a gap detection based error recovery system.

These and other objects are met according to the present invention by an error recovery system for use in a data communication system in which a sender station transmits sequentially numbered information packets, comprising one or more bytes, to a receiver station. Preferably, each byte is sequentially impliedly numbered so that the packet sequence number can point to a byte sequence number. According to the present invention, the system detects if the information packets have been transmitted without error and further determines the order in time of transmission of the information packets independent of the sequential number of the information packets. Retransmission is controlled to avoid unnecessary retransmission of packets which have not been acknowledged but which may simply not yet have been received. Except in the case of a last information packet, retransmission is performed only for information packets which have not yet been positively acknowledged if such information packets were transmitted earlier in time than an information packet which has been positively acknowledged.

In an embodiment of the error recovery system of the present invention, the transmission order of information packets is determined independent of the sequential number of the information packets by placing the transmitted information packet at the end of a list at the time of the transmission. An entry in the list may include a length field, data of the length specified, sequence number of the first byte of data, and a pointer to the memory location of the next entry. This system of determining the transmission order applies independent of whether it is a first transmission or a retransmission of information packets.

In another aspect of the present invention a system is provided to promptly notify the sender station if an error in transmission has occurred. According to the present invention, this capability is provided by detecting a gap (i.e. missing sequence numbers) in the sequence numbers of correctly received information packets. A status packet is transmitted to the sender station when a gap is detected. Therefore, the sender station is informed of a gap as soon as possible after the gap is detected so that retransmission may be provided as quickly as possible to prevent accumulation of data in the buffer memory of the receiver station. In one embodiment of the present invention, the status packet contains the sequence number of the highest sequence number information byte which has been correctly received without any gaps in the preceding correctly received information byte sequence numbers and further contains the start and stop sequence numbers of any spans of correctly received information bytes. Additionally, the system retransmits the status packet upon expiration of a timer.

In another aspect of the present invention a flow control mechanism is provided. According to this aspect of the present invention, the sender station determines if its transmission window could close before another status packet is received from the receiver station. In that case, the sender station requests a status packet from the receiver station early enough so that the requested packet is expected to be returned before the transmission window is closed. The acknowledged information packet information may then be updated. In particular, the status packet includes an Allocated Sequence Number (ASEQ) in the status segment. ASEQ indicates the highest sequenced-numbered byte the sender should transmit. Accordingly, the flow control mechanism allows the sender station to update its knowledge of the contents of the receiver station buffer as data is passed from the buffer to the user applications program by the receiver station so that the sender station can continue to transmit new data while still avoiding a buffer overflow or a transmission slowdown.

In another aspect of the present invention a sender station is provided for use in a data communication system in which the sender station transmits sequentially numbered information packets to a receiver station. A linked list of memory locations having a beginning and an end is maintained at the sender station. As information packets are transmitted, an identification of each information packet, such as the sequential number or the information packet itself, is placed at the end of the linked list. Therefore, the transmission order of information packets is reflected by their relative position in the linked list. According to an embodiment of this aspect of the present invention, when a status packet is received from the receiver station the sender station determines from the status packet which sequentially numbered information packets have been correctly received by the receiver station. The sender station identifies, based on position in the linked list, any sequentially numbered error-containing information packets which which were transmitted earlier in time than one of the information packets which has been correctly received (i.e. an information packet not yet acknowledged whose sequence number is positioned in the linked list closer to the beginning of the linked list than the sequence number of one of the correctly received information packets). Finally, the sender station retransmits any such information packets.

Error recovery methods are also provided by the present invention. These methods are directed to selective retransmission based on transmission order timing which is determined independent of the sequence number of the transmitted information. In various embodiments, these methods include the gap detection and retransmission operations described above and further provide for detecting if any error has occurred in the transmission of the last information packet to be transmitted where gap detection is not available as a means of detecting errors in transmission.

By providing a true transmission order based retransmission control mechanism which operates independently of the sequential numbers of the information packets, the present invention provides an efficient system and method for error recovery based on selective retransmission of only those information packets which are known to have had an error in transmission. The system and method of the present invention operate in data communication systems implementing a variety of transmission protocols and data packeting formats while placing less computational burden on the sender station than previously proposed error recovery systems. The present invention also provides the capability to determine if errors have occurred in data transmission based on acknowledgement of information packets which have only been transmitted once or which have been retransmitted. The present invention further provides for improved performance through the provision of a flow control system and initiation of transmission of status packets by the receiver station responsive to detection of a transmission error.

BRIEF DESCRIPTION OF THE DRAWINGS

FIG. 5 is a diagram showing the relationship between FIGS. 5A and 5B.

FIG. 7 is a flow chart illustrating an embodiment of the method of the present invention.

DETAILED DESCRIPTION OF THE PREFERRED EMBODIMENTS

The error recovery mechanism of the present invention provides a high performance selective repeat error recovery system for use with data communication networks using Data Link Control ("DLC") wherein data is grouped for transmission into sequentially numbered frames or packets. Typical examples of DLC protocols include International Business Machine's ("IBM's") Synchronous Data Link Control ("SDLC"), Digital Equipment Corporation's ("DEC's") Digital Data Communications Message Protocol ("DDCMP"), the International Standards Organization's ("ISO's") standard High-Level Data Link Control ("HDLC"), or the Institute of Electrical and Electronic Engineer's ("IEEE's") standard 802.2. A description of such DLC protocols is provided in U.S. Pat. No. 4,439,859 which is incorporated herein by reference as if set forth in its entirety. Of particular interest in understanding the data link control protocols relevant to the present invention is the portion of U.S. Pat. No. 4,439,859 at Col. 3 lines 12 through 68 and the references cited therein. The error recovery mechanism of the present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
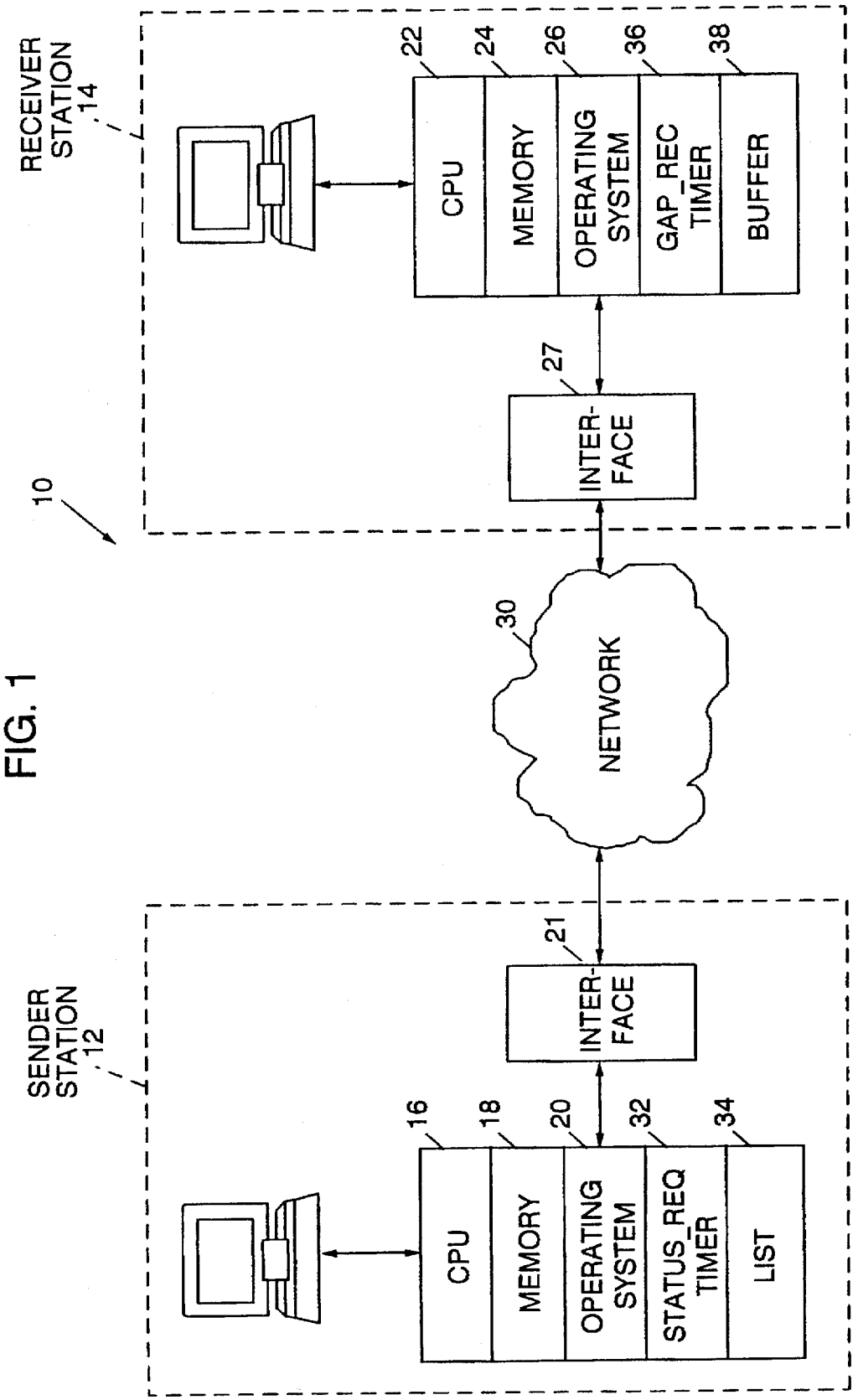
FIG. 1 is a schematic diagram illustrating a data communication system incorporating the error recovery mechanism of an embodiment of the present invention.

Referring now to FIG. 1, a data communication system 10 implementing an embodiment of the present invention is illustrated. For purposes of illustration, data communication system 10 is shown as including a sender or transmitter station 12 and a receiver station 14. However, it is to be understood that in a typical data communication network, stations 12 and 14 will each act as both a sender and a receiver depending on whether the station is sending or receiving data. Sender station 12 includes microprocessor or Central Processor Unit ("CPU") 16 or other control means and memory 18. CPU 16 runs operating system 20 of sender station 12. In addition, CPU 16 may run application programs or user operations (not illustrated) of sender station 12. Sender station 12 interfaces with communication network 30 through communication interface 21. Communication network 30 may include satellite links or terrestrial links such as a T1 or T3 transmission link. Communication interface 21 may be a modem or other means for interfacing between a station and communication network 30 and transmitting information or status packets.

Likewise, receiver station 14 includes microprocessor or CPU 22, memory 24 and operating system 26. CPU 22 may run application programs or user operations (not illustrated) of receiver station 14. Receiver station 14 interfaces with communication network 30 through communication interface 27 or other means for transmitting information or status packets.

The elements described above are known to those of ordinary skill in the art and will not be described further herein. For purposes of the present invention, it is to be understood that the user application program of sender station 12 provides user data for transmission to receiver station 14 and the received user data is provided to the user application program of receiver station 14 by the error recovery system of the present invention. The error recovery system of the present invention further provides acknowledgment of received user data from receiver station 14 to sender station 12 which may be provided to the user application program of sender station 12. It is also to be understood that the operations of the present invention as described herein may be executed by CPU 16, 22 or, alternatively, be performed by application specific integrated circuits and may utilize memory 18, 24 and interact with operating system 20, 26. Stations 12, 14 may be a mainframe computer such as an IBM System/390 processor, a midrange computer such as an IBM AS/400 processor, a server, a workstation, or a personal computer as will be understood by those of ordinary skill in the art.

Again referring to FIG. 1, sender station 12 further includes timer 32 and list 34. Timer 32 is referred to herein as status requested ("STATUS_REQ") timer. Receiver station 14 further includes timer 36 and buffer 38. Timer 36 is referred to herein as gap received ("GAP_REC") timer. Buffer 38 is referred to herein as resequencing buffer. Timers and other means for measuring the passage of time after an event suitable for use as the timers 32 and 36 of the present invention are conventionally known as will be understood by those of ordinary skill in the art. Buffer 38 may be provided by storage devices such as laches, registers, flip-flops or other memory devices as will be understood by those of ordinary skill in the art. List 34 may be provided by a linked list or other storage device with or without the use of pointers or other indexing means which allow a positional association of entered data as will be understood by those of ordinary skill in the art. The operation of list 34 and timers 32, 36 and buffer 38 in the error recovery system of the present invention will be described further herein.

Figure 2:
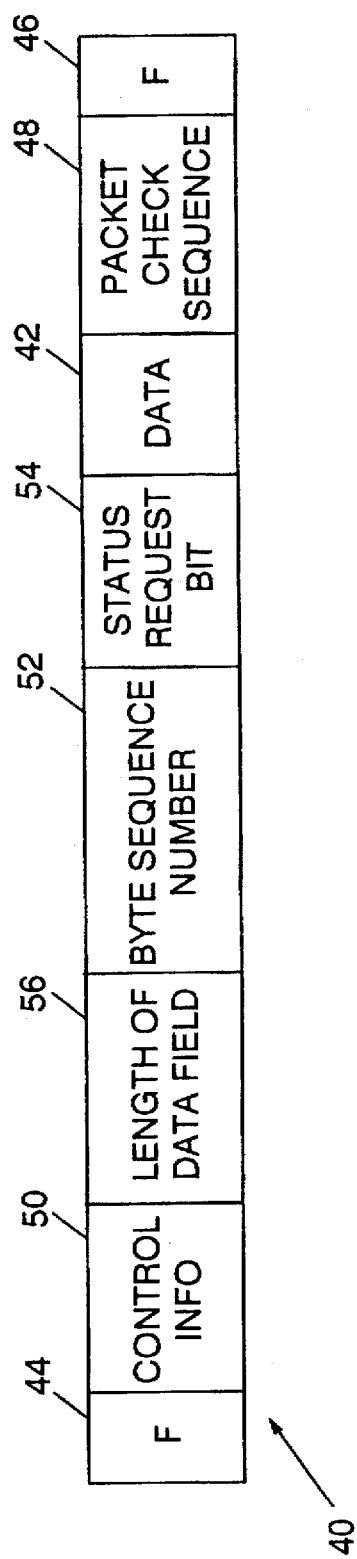
FIG. 2 is a schematic diagram illustrating the format of a data packet for carrying user data in an embodiment of the present invention.
Figure 3:
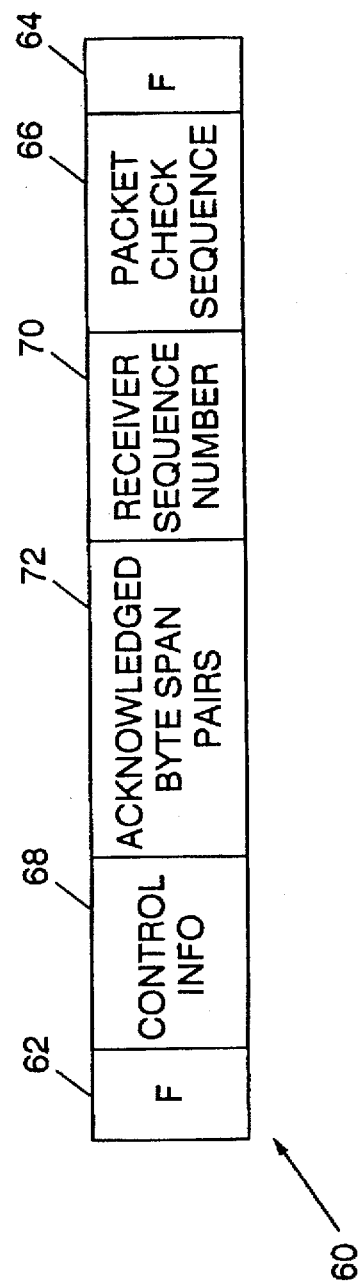
FIG. 3 is a schematic diagram illustrating the format of a status packet for reporting lost data in an embodiment of the present invention.

The format of the information frames or packets of the present invention is shown in FIGS. 2 and 3. In the high performance error recovery system of the present invention, two types of information packets are defined to handle reliable information flow. The first type of packet is a data packet 40 which is used to carry user data and the second type is a status packet 60 which is used to report lost data packets 40 and carries no user data. It is to be understood that, in practice, illustrated sender station 12 and receiver station 14 will generally act as both sender and receivers in connection with transmission of different user data and, accordingly, while status packet 60 is described as containing no user data it may be piggybacked with a data packet 40 containing user data which is concurrently being transmitted from station 14 to station 12.

A format of data packet 40 containing user data to be communicated from sender station 12 to receiver station 14 suitable for use with an embodiment of the present invention is illustrated in FIG. 2. Data packet 40 may be of either a fixed length or a variable length. Likewise, data field 42 of data packet 40 may be of either a fixed length or a variable length. The packet format includes flag 44 which marks the beginning of data packet 40 and flag 46 which marks the end of data packet 40. Data packet 40 also includes packet check sequence field 48 which enables receiver station 14 to determine if the packet is received free of errors.

Finally, data packet 40 includes one or more control fields containing packet information required for proper network control. Control field 50 contains general information such as address, etc. which information is defined by the protocol in use on network 30. Byte sequence number field 52 contains the sequence number of the current data packet. As will be understood by those of ordinary skill in the art, a byte sequence number in a data communication system using Automatic Repeat Request ("ARQ") is a sequential number assigned to user data to be communicated from sender station 12 to receiver station 14 at the time it is prepared for transmission over network 30. Sequence numbers can be either assigned to packets or bytes. If the underlying network 30 imposes a limitation on the size of packets and packets can have variable length headers and, as a result, variable length data payloads, then each byte of data in the packet is assigned a sequence number to allow for piggybacking of data with control information. Only the sequence number of the first byte is included in the packet header; subsequent bytes are numbered implicitly from the byte sequence number plus 1 to the byte sequence number plus the length of the data field 56 minus 1. Otherwise, assigning sequence numbers to packets is sufficient. The byte sequence number 52 is used by receiver station 14 to determine the order that the received user data should be placed in before it is provided to the recipient user application program on receiver station 14. The byte sequence number also serves as a identifier allowing receiver station 14 to acknowledge to sender station 12 error free receipt of numbered data packets 40.

Data packet 40 also includes a status request field 54 which may be a one-bit field. Status request field 54 is set to 1 by sender station 12 to request a status packet 60 from receiver station 14.

A format for status packet 60 is illustrated in FIG. 3. As described above in connection with data packet 40, status packet 60 includes flags 62 and 64 which respectively indicate the beginning and end of status packet 60, packet check sequence field 66 which is used by sender station 12 to determine if status packet 60 was received without error and control field 68 which contains general information such as address, etc. which information is defined by the protocol in use on network 30.

Status packet 60 also includes receiver sequence number field 70. Receiver sequence number field 70 contains the sequence number of the highest sequence number information byte (or packet) which has been correctly received without any gaps in the preceding correctly received information byte sequence numbers of the user data stream (or one greater than that sequence number to express this value in a next number expected format). A "gap" is a space or break in the sequential numbers of the information packets which means that receiver station 14 is missing a portion of the data stream which must be placed between two correctly received portions of the data stream before the data is passed on to the user applications program of receiver station 14. For example, in an embodiment where each information packet corresponds to only one sequence number, a gap would exist if a difference of more than one was detected between adjacent sequence numbers. Therefore, status packet 60 acknowledges to sender station 12 receipt of all user data bytes (or packets) through the byte sequence number contained in field 70.

Status packet 60 also includes Allocated Sequence Number (ASEQ) field 71, described below. In addition, status packet 60 includes acknowledged byte span pairs field 72. Acknowledged byte span pairs field 72 includes the start and stop sequence numbers of any spans (ranges) of correctly received user data bytes (or packets) with sequence numbers greater than that contained in receiver sequence number field 70 which have been received by receiver station 14. That is, the first sequence number in a pair would contain the sequence number of the first byte of the first correctly received packet and the second sequence number in the pair would contain the sequence number of the last data byte in the last correctly received packet (or one greater than that sequence number to express this value in a next number expected format). Status packet 60 may be provided with an additional field (not shown) which contains the number of acknowledged byte span pairs which are contained in status packet 60. It is to be understood that other formats of status packets could be utilized with the present invention which provide for acknowledgement of correctly received packets. For example, field 70 may contain the packet sequence number of the highest number correctly received packet plus one and field 72 may contain the packet sequence number of any packets with a packet sequence number lower than the highest number correctly received packet which have not been correctly received.

During communications between sender station 12 and receiver station 14, so long as no error is encountered, sender station 12 transmits data packets 40 in sequential order until all data packets 40 have been transmitted. On receipt of data packets 40, receiver station 14 passes the data packets 40 through resequencing buffer 38 to the user applications program of receiver station 14 in byte sequence number order. However, in selective repeat system such as that of the present invention, data packets 40 can arrive out of sequence. Therefore, resequencing buffer 38 is provided to put the data packets 40 in order prior to providing them to the user application program. As data packets 40 are received, they are placed in buffer 38 in an order corresponding to their sequence number rather than their transmission order. If no errors are encountered, the transmission order will be identical to the sequence number order. Data packets 40 are passed from buffer 38 only if there are no earlier gaps so that the data is provided to the user applications program in the same order as the original data stream from the user applications program of sender station 12. Passing data to the user applications program frees up space in buffer 38 to receive additional data packets 40.

Because resequencing buffer 38 is of a finite size, situations can occur where resequencing buffer 38 at receiver station 14 contains correctly received data packets 40 following an existing gap; such data packets 40 cannot be passed from resequencing buffer 38 to the user application program. As a result, such a system may slow down. Stated another way, when the receiver sends an Allocated Sequence Number (ASEQ) to the sender, the sender is prevented from sending data for which the receiver does not have buffer space. The receiver sets aside memory for data with sequence number up to ASEQ. If it receives data with a higher sequence number as a result of a sender error, the data is discarded. To prevent this, a flow control mechanism is provided based on a transmission window that prevents sender station 12 from transmitting new data packets 40 when resequencing buffer 38 may not be able to accept new data. The flow control mechanism operates as follows. Let B be the size of receiver's resequencing buffer in bytes 38 (also referred to as the receiver's window size), let U be the number of unacknowledged data bytes, let A be the number of acknowledged data bytes following the oldest existing gap. Then sender station 12 at any time can only transmit up to B−(A+U) bytes of new data. This calculation is preferably made at the receiver. The receiver adds the size of its resequencing buffer to the highest received sequence number without an earlier gap. The sum is ASEQ. Accordingly, the size of the resequencing buffer can change over time based on existing conditions, such as the number of active receivers in the node. Further, the receiver may choose to set ASEQ to a higher value optimistically assuming that buffer space will be available by the time the data is received; if the buffer space is not available when the data arrives because of previous gaps, the receiver discards the data. Alternatively, the calculation can be made at the sender provided that sender learns the receiver's buffer size at connection initiation. In this case, the sender updates the calculation each time it receives acknowledgement information in a status packet 60, and the receiver does not need to include ASEQ in the status packet.

In an embodiment of the present invention using flow control, sender station 12 needs acknowledgment to determine if data packets 40 were received without error to avoid triggering the flow control mechanism and free its buffers containing the previously transmitted data. Therefore, receiver station 14 transmits one or more status packets 60 to sender station 12. A mechanism is provided to initiate transmission of status packet 60 by receiver station 14. Sender station 12 determines if its own transmission window could close before a new status packet is received by sender station 12. If so, sender station 12 transmits a request for a status packet 60 to receiver station 14 by setting the bit in the status request bit field 54 of data packet 40. The status request bit in field 54 is set by sender station 12 soon enough that sender station 12 will have sufficient window to continuously transmit new data. A status packet 60 must be requested far enough in advance to allow for round-trip delay and some processing time so that the requested status packet 60 will be received by sender station 12 before the flow control mechanism prevents transmission of new data. Whenever receiver station 14 receives a data packet 40 with the status request bit field 54 set, receiver station 14 prepares and transmits a status packet 60 containing current information including acknowledgement of correctly received information packets to sender station 12. Alternatively, receiver station 14 can be provided with a mechanism to promote continuous transmission as B and A are both known to receiver station 14 and U can be estimated based on the data transmission rate. Therefore, receiver station 14 can be provided with a means for determining when its receive window will close and transmitting a status packet 60 to sender station 12 soon enough to prevent interruption in the transmission of new data.

As it is possible for an error to occur in transmission status packet 60 or of the data packet 40 with the status request bit field 54 set, STATUS_REQ timer 32 is provided. It is to be understood that timer 32 may be implemented in a software operation performed by CPU 16 or implemented with a hardware timer. Whenever sender station 12 sends a data packet 40 with a status request, sender station 12 starts (or resets and restarts if already running) STATUS_REQ timer 32. The status request bit field 54 of data packet 40 is only set on subsequent data packets 40 while STATUS_REQ timer 32 is running if no additional packets can be transmitted (i.e. the data packet to be transmitted closes the window or no additional data is queued for (re) transmission). If sender station 12 receives a status packet 60 which acknowledges the data payload (if any) of the last data packet 40 which was transmitted with status request bit field 54 set, STATUS_REQ timer 32 is stopped. If STATUS_REQ timer 32 expires, sender station 12 transmits a data packet 40 with the status request bit field 54 set (piggybacked with data when possible) and restarts STATUS_REQ timer 32. Typically, a maximum retransmission count is defined in order to detect failure of the transmission path. Preferably, the period of STATUS_REQ timer 32 is set based on a worst case estimate of the round-trip delay between sender station 12 and receiver station 14 allowing for some processing time of the request and response by the stations.

In a communication channel employing ARQ to handle errors in data transmission, the loss of a transmitted data packet is detected by the data communication system 10. The loss of a transmitted data packet 40 is detected at receiver station 14 by detecting a gap in the sequence numbers of correctly received information packets based on the byte sequence numbers in the byte sequence number field 52 of correctly received data packets 40. For purposes of explanation herein, it will be assumed that each data packet 40 is assigned by sender station 12 a single sequential number corresponding to the order in which the data is received from the user applications program of sender station 12 and the order in which the data is to be provided to the user applications program of receiver station 14. However, it is to be understood that in practice each byte of data may be provided such a sequential number and data packet 40 contains information which allows receiver station 14 to determine the starting and range of sequential byte sequence numbers of data contained in a correctly received data packet 40 to thereby determine what sequential byte sequence number to expect to receive next. In any event, when an error occurs in transmission of a data packet 40, all data in that data packet 40 is lost under commonly used ARQ protocols.

Upon detection of a gap by receiver station 14 it is desirable that the lost data be retransmitted as soon as possible because data is provided to the user applications program of receiver station 14 in byte sequence number order and all correctly received data packets containing data with byte sequence numbers higher than the missing byte sequence number(s) is retained in resequencing buffer 38 until the earlier data is retransmitted and correctly received by receiver station 14. Therefore, in an embodiment of the error recovery system of the present invention, upon detection of a new gap, receiver station 14 transmits to sender station 12 a status packet 60 (piggybacked with data when possible) containing acknowledgement of correctly received information packets (thereby reporting the new gap and any previous unrecovered gaps) using the format described previously in connection with FIG. 3.

As it is possible for an error to occur in transmission of the status packet 60 reporting the new gap, a means for detecting if the status packet was received without error by sender station 12 and for retransmitting the status packet if it was not received without error is provided. Whenever receiver station 14 sends a status packet 60 which reports the existence of a gap, receiver station 14 starts (or resets/ restarts if already running) GAP_REC timer 36. It is to be understood that timer 36 may be implemented in a software operation performed by CPU 22 or implemented with a hardware timer. When GAP_REC timer 36 expires, it is restarted and a new status packet 60 is sent. GAP_REC timer 36 is not stopped unless all lost data packets are recovered (i.e. no gaps are present). The period of GAP_REC timer 36 is preferably determined based on channel loss probability of network 30. The higher the channel loss probability, the smaller should be the period of GAP_REC timer 36. In any event, with the present invention it is preferred that the period of GAP_REC timer 36 be less than or equal to the period of STATUS_REQ timer 32.

As described above, transmittal of a status packet 60 may be triggered by three conditions. A status packet 60 may be requested by sender station 12 to prevent slow down. A status packet 60 may also be sent by receiver station 14 without any request from sender station 12 when a new gap is detected in received data. Finally timers 32, 36 are provided at each station 12, 14 to initiate retries in case a data transmission error occurs in a transmission requesting a status packet or in the transmission of a status packet. However, it is to be understood that, while preferable, the benefits of the present invention may be obtained using alternative mechanisms for initiating transmittal of status packets 60. For example, receiver station 14 could simply transmit status packets 60 after a selected period of time has passed or a selected number of data packets 40 have been received since a status packet 60 was last transmitted. Furthermore, it is to be understood that a flow control mechanism as described above need not be provided. In addition, the number of retries which will be attempted may be limited to a predetermined number after which the communication link between sender station 12 and receiver station 14 will be flagged as out of operation.

Upon reception of a status packet 60, sender station 12 determines whether to retransmit a data packet 40 reported as being in a gap. In order to retransmit a data packet 40 only if it was lost, sender station 12 will retransmit an unacknowledged data packet only if a transmission of a data packet 40 following the data packet 40 in time (regardless of the sequence number of the data packets 40) has been acknowledged. Therefore, sender station 12 determines the order in time of transmission of data (information) packets 40 independent of the sequential number of such data packets 40 and is provided retransmission control means, as described for an embodiment of the present invention below, for identifying any data packets 40 which have not been transmitted without error and which were transmitted earlier in time to a data packet 40 which has been transmitted without error and for providing any such data packets 40 for retransmission by transmitting means 21.

In an embodiment of the present invention, to determine the order of transmission of data packets 40, sender station 12 is provided with list 34 in which sender station 12 includes an identification of transmitted data packets 40 which have not been acknowledged, which identification may include the data packets and/or their associated sequence numbers. The list entries are associated (linked or chained) in the order of the most recent transmission regardless of the byte sequence number of the data by placing the identification of the transmitted data packet at the end of list 34 at the time of transmission of data packet 40. Thus, when a data packet 40 is transmitted (regardless of whether it contains a first transmission of new data with the next sequential byte sequence number or a retransmission of data with an earlier byte sequence number which had encountered a data transmission error on a previous transmission attempt), it is placed at the end of list 34. When sender station 12 receives a status segment 60, sender station 12 determines which acknowledged data packet 40 was transmitted most recently. Sender station 12 retransmits each unacknowledged data packet 40 identified in list 34 that was last transmitted prior to the most recently transmitted, acknowledged data packet 40. Any sequential number which was placed in list 34 before the sequential number of a data packet 40 which has been transmitted without error, would have been transmitted earlier in time than the acknowledged data packet 40. In addition, sender station 12 removes from list 34 the identification of any data packet which has been transmitted without error.

The error recovery system of the present invention is based upon the use of gap detection to deduce that data packet(s) 40 have been lost. However, as a gap can only be detected if a data packet with a higher byte sequence number is correctly received, a problem can be encountered if an error occurs in the transmission of the very last data packet 40 in a sequence of data packets 40. In order to ensure the correct delivery of the last data packet 40, sender station 12 sets the status request bit field 54 on the last data packet 40 to be sent and starts STATUS_REQ timer 32. If STATUS_REQ timer 32 expires, the last data packet 40 in list 34 is retransmitted with status request bit field 54 set and STATUS_REQ timer 32 is restarted. When sender station 12 receives a status packet 60 that acknowledges the receipt of all transmitted data packets 40, STATUS_REQ timer 32 is stopped. Otherwise, list 34 is used as described above to determine which data packets 40 to retransmit. If any data packets 40 are retransmitted, the status request bit field 54 is set in the last retransmitted data packet 40 and STATUS_REQ timer 32 is restarted. STATUS_REQ timer 32 continues to run if none of the unacknowledged data packets are retransmitted.

Figure 4:
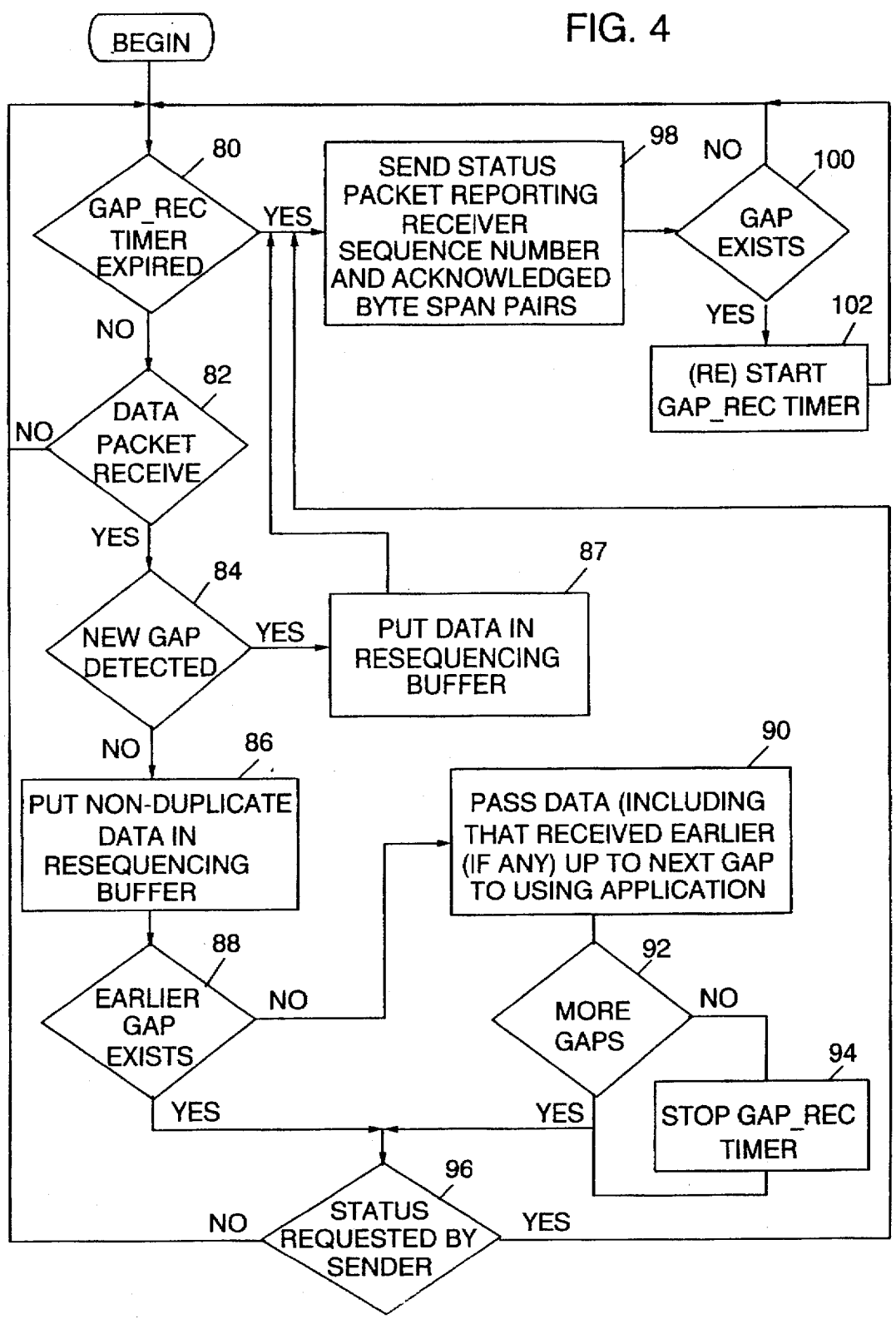
FIG. 4 is a flow chart illustrating an embodiment of the operation of the receiver station of the present invention.

The operations of receiver station 14 of an embodiment of the error recovery system of the present invention will now be described with reference to FIG. 4. It will be understood that these operations may be performed by a stored program which executes on CPU 22, by hardware in receiver station 14 or a combination thereof. As illustrated in FIG. 4 at block 80, receiver station 14 tests GAP_REC timer 36 to determine if it has expired. If GAP_REC timer 36 has not expired (or is not running) receiver station 14 determines if a data packet 40 has been received at block 82. If a data packet 40 has been received, receiver station 14 deduces if a new gap has been detected based on the byte sequence number field 52 of the received data packet 40 at block 84. If no new gap is detected receiver station 14 puts any received data which is not already in resequencing buffer 38 in buffer 38 at block 86. This is referred to as "non-duplicate" data in FIG. 4. As will be understood from the description herein, however, using the error recovery system of the present invention "duplicate" data should never be transmitted by sender station 12 except for the last information packet. Likewise, even if a new gap is detected at block 84, receiver station 14 puts any received data which is not already in resequencing buffer 38 in buffer 38 at block 87.

At block 88, receiver station 14 determines if any gap exists for a byte sequence number lower than the byte sequence number of the most recently received data packet 40. If no gap exists at a byte sequence number lower than the byte sequence number of the most recently received data packet 40, receiver station 14 passes the correctly received data in byte sequence number order (including any data previously correctly received and placed in resequencing buffer 38) up through the next gap to the user applications program of receiver station 14 at block 90. Receiver station 14 determines if any more gaps exist in the data in buffer 38 at block 92. If no gaps exist, GAP_REC timer 36 is stopped at block 94. Regardless of whether more gaps are detected at block 92 and if an earlier gap is identified as existing at block 88, the status request bit field 54 is tested at block 96 to determine if sender station 12 has requested transmission of a status packet 60.

If GAP_REC timer 36 has expired at block 80 or after placing data in resequencing buffer 38 at block 87 or if a status request bit is detected from sender station 12 at block 96, receiver station 14 sends a status segment 60 including receiver sequence number field 70 and acknowledged byte span pairs field 72 containing current information to sender station 12 at block 98. Receiver station 14 then determines if any gaps exists at block 100 and, if so, starts (or restarts if already running) GAP_REC timer 36 at block 102. If no gap exists at block 100 or if no new data packet is received at block 82 or if no status packet has been requested at block 96 operation returns to begin with testing of GAP_REC timer 36 at block 80.

Figure 5A:
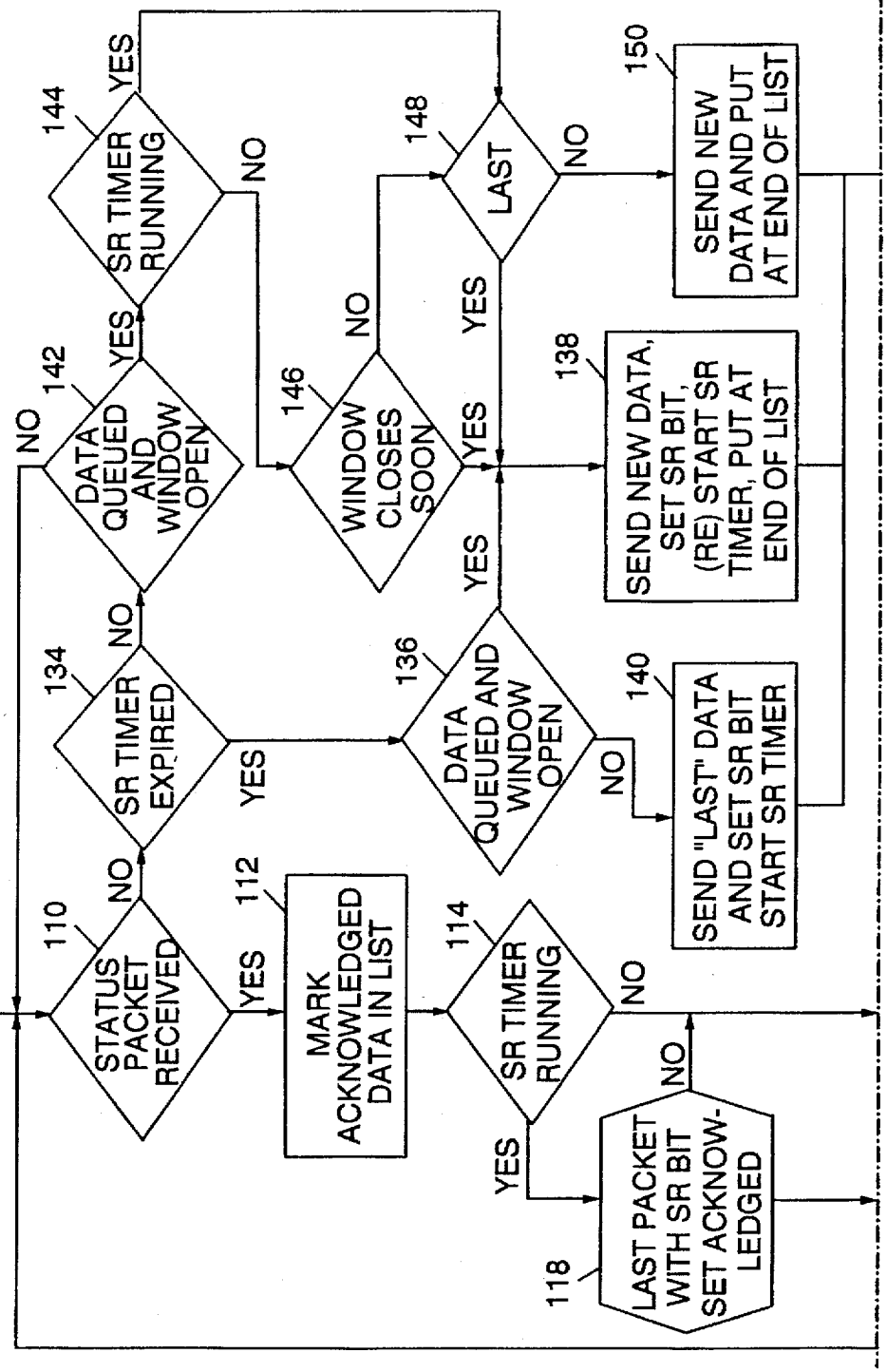
FIGS. 5A and 5B are flow charts illustrating an embodiment of the operation of the sender station of the present invention.
Figure 5B:
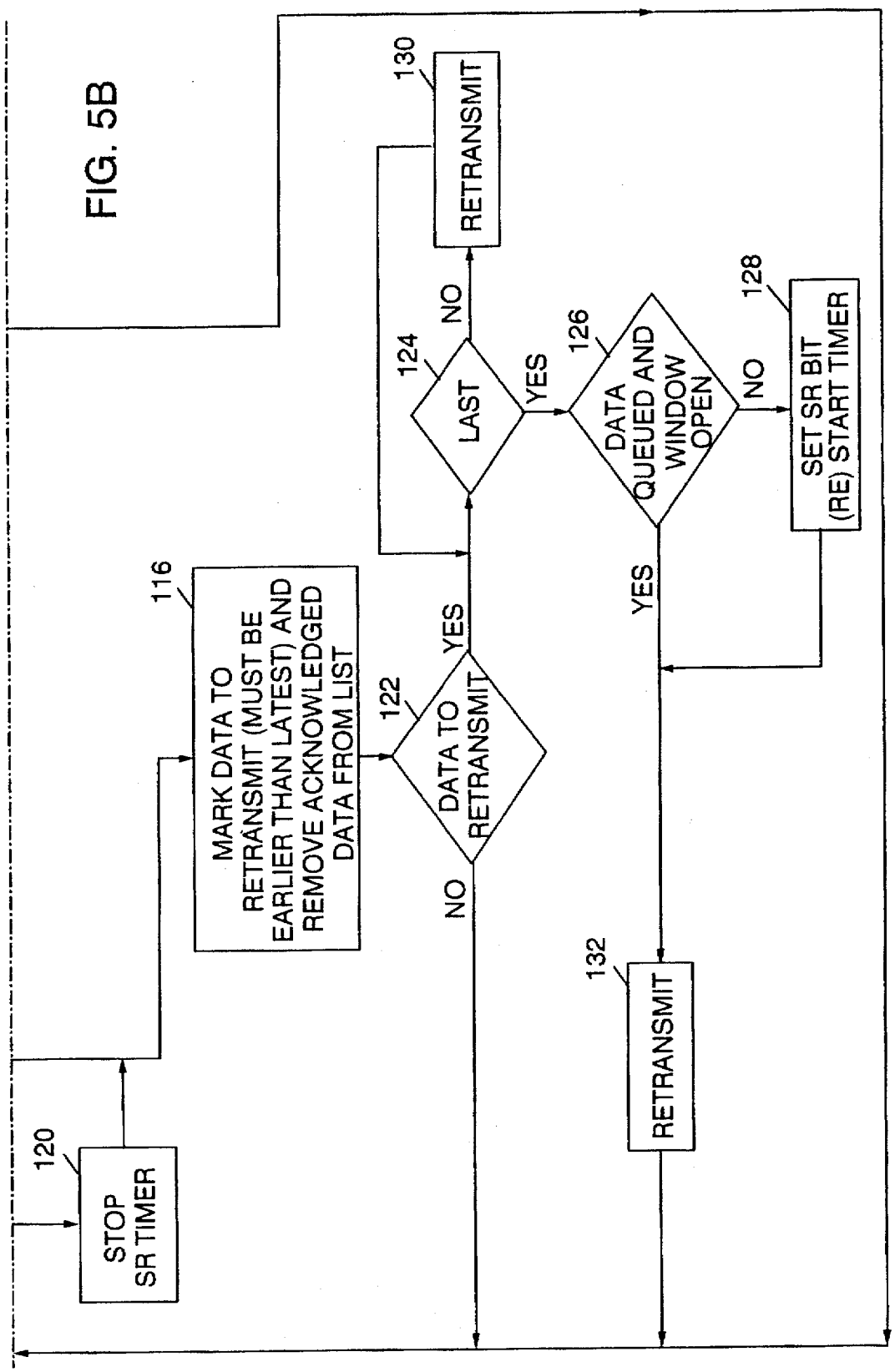

The operations of sender station 12 of an embodiment of the error recovery system of the present invention will now be described with reference to FIGS. 5A and 5B. As with FIG. 4, it will be understood that these operations may be performed by a stored program which executes on CPU 16, by hardware in sender station 12 or a combination thereof. Sender station 12 determines if a status packet 60 has been received at block 110. If a status packet 60 has been received, the acknowledged data packets 60 are marked as acknowledged in list 34 at block 112. STATUS_REQ timer 32 is then checked to determine if it is running at block 114. If STATUS_REQ timer 32 is not running, sender station 12 marks data which has not been acknowledged and which was transmitted earlier in time than the latest data which was acknowledged (based on relative position in list 34) for retransmission at block 116. Also at block 116, data in list 34 which has been marked as acknowledged at block 112 is removed from list 34. If STATUS_REQ timer 32 is running at block 114, sender station 12 determines if the most recently transmitted packet with status request bit field 54 set has been acknowledged at block 118. If so, STATUS_REQ timer 32 is stopped at block 120 before execution of block 116 operations.

At block 122, sender station 12 determines if it has any data to retransmit. If so and the data to retransmit is determined to be the last data packet 40 to retransmit at block 124, sender station determines if new data is queued to transmit and the flow control mechanism indicates the window is open (i.e., transmission of new data is allowed) at block 126. If not, then the last data packet is being transmitted by sender station 12 so status request bit field 54 is set and STATUS_REQ timer 32 is started (or reset and restarted if already running) at block 128. If there are additional data packets 40 to transmit (either additional retransmittal or new transmittal), sender station 12 retransmits the data packet marked to retransmit at blocks 130 or 132 respectively depending on whether it is transmitting the last data packet 40 marked for retransmission. After it is determined at block 122 that there is no data to retransmit or the last retransmit data packet 40 is sent at block 132 operation returns to begin by checking if a new status packet 60 has been received at block 110.

If a status packet 60 is not received at block 110, sender station 12 determines at block 134 if STATUS_REQ timer 32 has expired. If the timer has expired and sender station 12 determines at block 136 that new data is queued to transmit and the flow control mechanism indicates the window is open (i.e., transmission of new data is allowed) then block 138 operations as follows are executed; a data packet 40 with new data is transmitted with the status request bit field 54 set to request a new status packet 60 from receiver station 14. STATUS_REQ timer 32 is started (or reset and restarted if it is already running), and the identification of the transmitted data packet is entered at the end of list 34 to indicate that it was the most recently transmitted data packet after which operation is returned to begin at block 110. If no new data is queued or the window is not open at block 136, then block 140 operations as follows are executed; a data packet 40 containing the same data as was most recently transmitted (the "last" data) is transmitted with the status request bit field 54 set to request a new status packet 60 from receiver station 14, and STATUS_REQ timer 32 is started (or reset and restarted if it is already running) after which operation is returned to begin at block 110.

If STATUS_REQ timer 32 has not expired at block 134 and if sender station 12 determines at block 142 that new data is queued to transmit and the flow control mechanism indicates the window is open and transmission of new data is allowed, then sender station 12 determines at block 144 if STATUS_REQ timer 32 is running. If STATUS_REQ timer 32 is not running, sender station 12 determines at block 146 if the transmission window will close soon as described above in connection with the flow control mechanism. If the window will close soon, block 138 operations are performed. If the window will not close soon or STATUS_REQ timer 32 is determined to be running at block 144, sender station 12 determines if the data to be transmitted is the last data to transmit at block 148, i.e. no more data is queued or the window will be closed by the next transmission. If it is the last data to transmit, block 138 operations are performed. If not, at block 150 a data packet 40 is transmitted with the new data (but without setting the status request bit field 54) and the identification of the transmitted data packet is entered at the end of list 34 to indicate that it was the most recently transmitted data packet after which operation is returned to begin at block 110. If sender station 12 determines at block 142 that no data is queued or the window closed, operation is returmned to begin at block 110.

Figure 6:
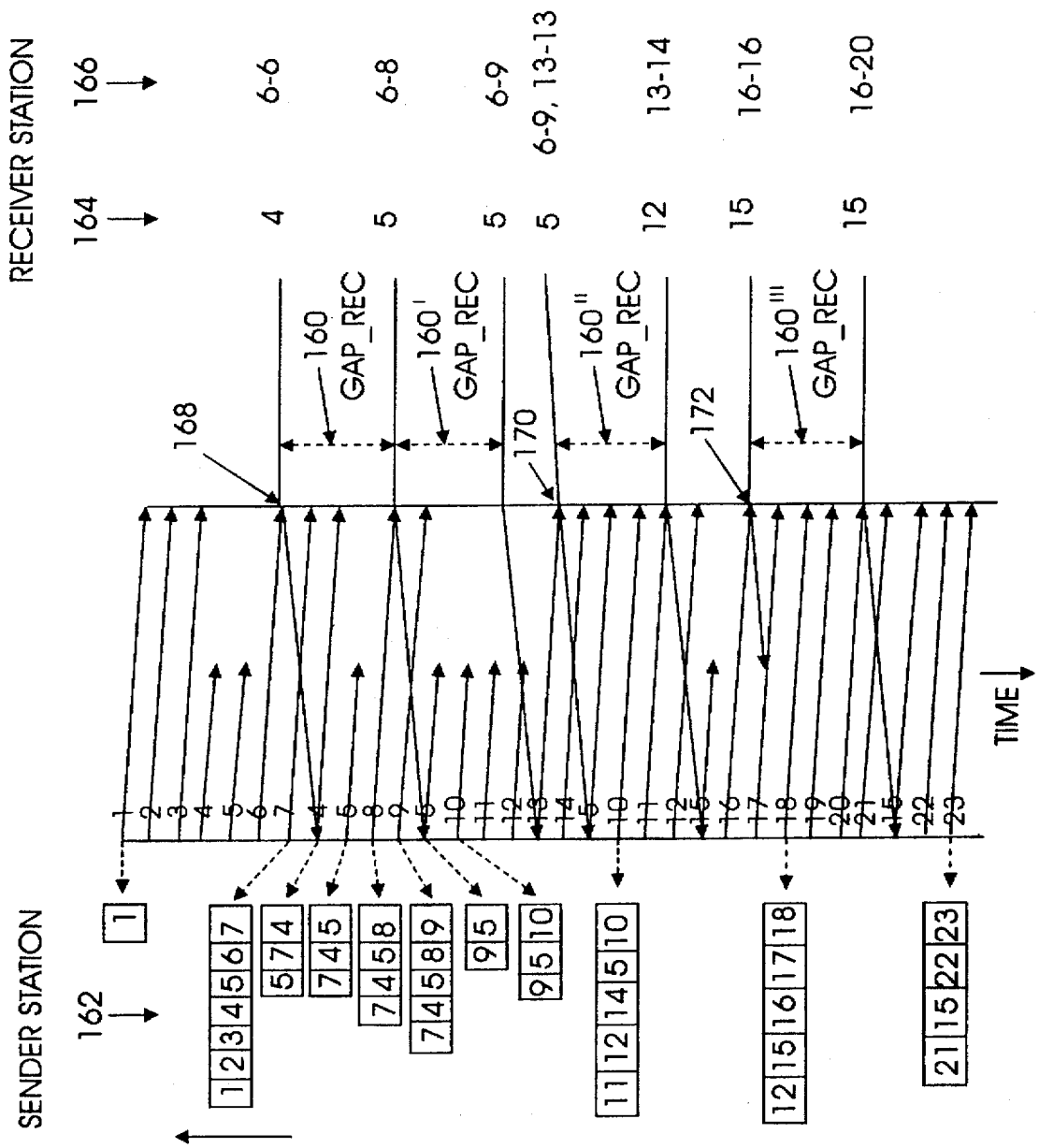
FIG. 6 is a schematic diagram illustrating an example of the operation of the error recovery system of the present invention.

An example of the operation of an embodiment of the present invention is illustrated in FIG. 6. Arrows moving from left to right in FIG. 6 indicate data packets 40 being transmitted by sender station 12 with the number on the arrows indicating the byte sequence number of each packet (note for purposes of the example each packet contains a single sequence number not a starting number and range). Arrows moving from right to left indicate transmission of a status packet 60 from receiver station 14 to sender station 12. Any arrow which does not extend all the way from between the sides indicates an error in transmission of the packet. Moving from the top of FIG. 6 to the bottom reflects passage of time. The running of GAP_REC timer 36 is indicated by arrows 160, 160', 160", and 160"'. The contents of list 34 at example points in time (not for every transmission) is illustrated graphically in the leftmost column of FIG. 6 designated generally as 162. Finally, for each status packet transmitted, the value of receiver sequence number 70 is shown in the first right side column designated generally as 164 and the values contained in acknowledged byte span pairs field 72 is shown in the second right side column designated generally as 166. Note that as illustrated in FIG. 6, the first transmission of a status packet 60 is initiated when receiver station 14 detects the loss of byte sequence numbers 4 and 5 after correctly receiving byte sequence number 6 at time 168. Likewise, the status packets 60 sent at times 170 and 172 are transmitted responsive to detection of a gap by receiver station 14. No status packet transmissions responsive to requests from sender station 12 are illustrated in FIG. 6.

To further illustrate the operations shown in FIG. 6 reference will now be made to the point in time 168. Receiver station 14 transmits a status packet to sender station 12. As receiver station 14 has received up through sequence number three with no preceding gaps, the status packet as illustrated in column 164 includes four in receiver sequence number field 70. (in the example illustrated in FIG. 6, the receiver sequence number has one added to the highest sequence number received with no preceding gap). In addition, receiver station 14 has received sequence number six. It was the receipt of sequence number six that triggered detection of a gap (6–3>1) and transmission of a status packet. At reference point 168 the status packet also acknowledges receipt of sequence number six by transmitting six-seven (in the example, the second number in an acknowledged byte span pair has one added to the sequence number of the last byte in the sequence of correctly received bytes) in acknowledged byte span pairs field 72 as illustrated in column 166.

Referring now to column 162, on receipt of the status packet, sender station 12 determines that sequence numbers four and five are not acknowledged and are earlier in list 34 (1,2,3,4,5,6,7) than acknowledged sequence number six. Sequence number seven is not acknowledged but it is not earlier in list 34 than an acknowledged sequence number so it is not identified for retransmission. The acknowledged sequence numbers are removed from list 34 and retransmission of sequence number four takes place. As illustrated in column 162, list 34 then contains five, seven, four in that order reflecting the transmission order of the information packets. After retransmission of sequence number five, list 34 contains seven, four, five. Note that it is not necessary to retain sequence numbers four and five in their first transmit position in list 34 and the earlier references are removed from list 34 rather than having two references to sequence numbers four and five in list 34 at any one time (i.e. seven, four, five rather than four, five, seven, four, five is the content of list 34 as illustrated in column 162). The rest of FIG. 6 may be understood as described for the examples above.

An embodiment of a method of the present invention is illustrated in FIG. 7. At block 180 sender station 12 transmits a data (information) packet to receiver station 14. Sender station 12 places the identification of the transmitted data packet at the end of a list at the time of transmission at block 182 to allow the system to determine the order in time of transmission of data packets independent of the sequential number of the data packets. A method of flow control is provided as illustrated at blocks 184 and 186. At block 184 the system determines if the sender station transmission window could close unless a new status packet is requested from receiver station 14. At block 186, a request for a status packet is transmitted to receiver station 14 if its transmission window could close unless a new status packet is requested. A method for providing acknowledgment of receipt of the last data packet to be transmitted is illustrated at blocks 188 and 190. At block 188 the system determines if the data packet to be transmitted to receiver station 14 is the last data packet to be transmitted. At block 190, a request for a status packet is transmitted to receiver station 14 if the data packet to be transmitted to receiver station 14 is the last data packet to be transmitted. In both cases, STATUS_REQ timer 32 is started when the request for a status packet is transmitted at block 186 or block 190. STATUS_REQ timer 32 is checked to determine if it has expired and if it has the request for a status packet is retransmitted and STATUS_REQ timer 32 is restarted at block 192.

The present invention detects if the data packet has been transmitted without error. This is shown in FIG. 7 as the steps of detecting a gap in the sequence numbers of correctly received data packets at block 194, and transmitting to sender station 12 a status packet containing acknowledgement of correctly received data packets responsive to the step of detecting a gap in the sequence numbers of correctly received data packets at block 196. GAP_REC timer 36 is started when the status packet is transmitted at block 196. GAP_REC timer 36 is checked to determine if it has expired and if it has the status packet is retransmitted and GAP_REC timer 36 is restarted at block 198.

The present invention retransmits any information packets which have not been transmitted without error which were transmitted earlier in time than a data packet which has been transmitted without error. This is shown in FIG. 7 as the steps of identifying and retransmitting any data packet which has not been acknowledged as received having a sequential number which is earlier in list 34 than a sequential number in list 34 of an acknowledged data packet at block 200 and, after identifying data packets for retransmission, removing from list 34 the sequential number of any acknowledged data packet at block 202.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An error recovery system for use in a data communication system in which a sender station transmits a plurality of information packets, each of the information packets having an associated sequential number to a receiver station, comprising:

means for transmitting said information packets;

means for detecting if said information packets have been transmitted without error;

means for determining an order in time of transmission of said information packets independent of the associated sequential numbers of said plurality of information packets;

retransmission control means, responsive to said means for detecting if said information packets have been transmitted without error and said means for determining an order in time of transmission of said information packets independent of the associated sequential numbers of said plurality of information packets, for identifying any of said information packets which have had an error in transmission and were transmitted by said means for transmitting information packets earlier in time than one of said information packets which has been transmitted without error and for providing any such information packet to said means for transmitting information packets for retransmission; and wherein said means for determining an order in time of transmission of said information packets independent of the associated sequential numbers of said plurality of information packets comprises means for placing an identification of a transmitted information packet at an end of a list at the time of transmission of the transmitted information packet.

2. The error recovery system of claim 1 wherein said means for placing an identification of a transmitted information packet at an end of a list at the time of transmission of the transmitted information packet comprises:

a linked list having a beginning and an end; and means for placing an identification of the transmitted information packet at the end of said linked list at the time of transmission of the information packet.

3. The error recovery system of claim 2 wherein said retransmission control means comprises:

means for providing to said means for transmitting said information packets for retransmission any information packet which has had an error in transmission which has a sequential number which was placed in said linked list before the associated sequential number of any information packet which has been transmitted without error; and means for removing from said linked list the associated sequential number of any information packet which has been transmitted without error.

4. The error recovery system of claim 3 wherein said means for detecting if said information packets have been transmitted without error comprises:

means for detecting a gap in the associated sequential numbers of correctly received information packets; and means for transmitting to said sender station a status packet containing acknowledgment of correctly received information packets responsive to said means for detecting a gap in the associated sequential numbers of correctly received information packets.

5. The error recovery system of claim 4 wherein said status packet contains the associated sequential number of a highest sequential number information packet which has been correctly received without any gaps in the associated sequential numbers of preceding correctly received information packets and further contains a start and stop sequence number of any spans of correctly received information packets having higher associated sequential numbers than the associated sequential number of the highest sequential number information packet which has been correctly received without any gaps in the associated sequential numbers of preceding correctly received information packets.

6. The error recovery system of claim 4 further comprising:

means for detecting if said status packet was received without error by said sender station and for providing to said means for transmitting to said sender station said status packet for retransmission if said status packet had an error in transmission.

7. The error recovery system of claim 6 wherein the data communication system defines a transmission window of the sender station further comprising:

means for determining if the transmission window of said sender station could close before a next status packet is received by said sender station; and means responsive to said means for determining if the transmission window of said sender station could close for transmitting a request for a status packet to the receiver station.

8. A sender station for use in a data communication system in which the sender station transmits a plurality of information packets, each of the information packets having an associated sequential number to a receiver station, comprising:

a transmitter operatively connected to said data communication system;

a linked list having a beginning and an end;

means for placing in said linked list at said end thereof the associated sequential number of each information packet transmitted by said transmitter as each information packet is transmitted by said transmitter so that said link list provides a transmission order list of the associated sequential numbers of said information packets.

9. A sender station according to claim 8 further comprising:

a receiver operatively connected to said data communication system;

said receiver receiving from said receiver station a status packet; and means operatively connected to said receiver and to said linked list for determining from said status packet which information packets have been correctly received by said receiver station and for determining based on position in said linked list any information packets which have not been correctly received by said receiver station which were transmitted earlier in time to one of said information packets which has been correctly received, and for providing any such information packets to said transmitter for retransmission.

10. An error recovery method for a data communication system in which a sender station transmits a plurality of information packets, each of the information packets having an associated sequential number, to a receiver station, comprising the steps of:

transmitting one of said plurality of information packets to the receiver station;

detecting if the transmitted information packet has been transmitted without error;

determining an order in time of transmission of the plurality of information packets independent of the associated sequential numbers of the information packets; and retransmitting any information packets which have had an error in transmission which were transmitted earlier in time than an information packet which has been transmitted without error; and wherein said step of detecting if the information packet has been transmitted without error comprises the steps of:

detecting a gap in the associated numbers of correctly received information packets; and transmitting to the sender station a status packet containing acknowledgment of correctly received information packets responsive to said step of detecting a gap in the associated sequential numbers of correctly received information packets.

11. The error recovery method of claim 10 wherein the status packet contains the associated sequential number of a highest sequential number information packet which has been correctly received without any gaps in the associated sequential numbers of preceding correctly received information packets and further contains a start and stop sequence number of any spans of correctly received information packets.

12. The error recovery method of claim 10 wherein the following steps are performed after said step of transmitting to the sender station a status packet containing acknowledgment of correctly received information packets:

starting a timer when the status packet is transmitted;

checking the timer to determine if it has expired;

retransmitting the status packet if the timer has expired; and, restarting the timer.

13. The error recovery method of claim 10 wherein said step of determining the order in time of transmission of the plurality of information packets independent of the associated sequential numbers of the information packets comprises the following step:

placing an identification of the transmitted information packet at a end of a list at the time of transmission of the information packet.

14. The error recovery method of claim 13 wherein said step of retransmitting any information packets which have had an error in transmission which were transmitted earlier in time than an information packet which has been transmitted without error comprises the step of:

identifying for retransmission any information packet which has not been acknowledged as received having a sequential number which is earlier in the list than a sequential number in the list of an acknowledged information packet.

15. The error recovery method of claim 14 wherein the data communication system defines a transmission window of the sender station further comprising the steps of:

determining if the sender station transmission window could close unless a new status packet is received; and, transmitting a request for a status packet to the receiver station if the transmission window of the sender station could close unless a new status packet is received.

16. The error recovery method of claim 14 further comprising the steps of:

starting a timer when a request for a status packet is transmitted;

checking the timer to determine if it has expired;

if the timer has expired, retransmitting the request for a status packet; and restarting the timer.

17. The error recovery method of claim 10 further comprising the steps of:

determining if the information packet to be transmitted to the receiver station is a last information packet to be transmitted;

transmitting a request for a status packet to the receiver station if the information packet to be transmitted to the receiver station is the last information packet to be transmitted;

starting a timer when the request for a status packet is transmitted;

checking the timer to determine if it has expired;

if the timer has expired, retransmitting the request for a status packet; and restarting the timer.

\* \* \* \* \*